United States Patent
Nagashima

(12) 
(10) Patent No.: US 6,968,199 B2
(45) Date of Patent: Nov. 22, 2005

(54) SCHEDULE NOTIFYING SYSTEM CAPABLE OF CORRECTING SCHEDULE DATE AND TIME

(75) Inventor: Yoshihisa Nagashima, Tokyo (JP)

(73) Assignee: NEC Corporation, Tokyo (JP)

( * ) Notice: Subject to any disclaimer, the term of this patent is extended or adjusted under 35 U.S.C. 154(b) by 428 days.

(21) Appl. No.: 10/151,917

(22) Filed: May 22, 2002

(65) Prior Publication Data

US 2002/0177442 A1    Nov. 28, 2002

(30) Foreign Application Priority Data

May 22, 2001    (JP) .............................. 2001-151874

(51) Int. Cl.[7] .............................................. H04Q 7/20
(52) U.S. Cl. ................. 455/502; 455/414.1; 455/435.1
(58) Field of Search ......................... 455/435.1, 412.2, 455/414.1, 435.3, 562.1, 457, 556.2, 502, 455/433; 370/395.4, 395.42, 395.1, 395.62; 340/7.31, 7.34, 7.35, 7.53, 7.58, 7.59; 707/10; 709/206, 246; 705/5

(56) References Cited

U.S. PATENT DOCUMENTS

| | | | |
|---|---|---|---|
| 5,128,981 A * | 7/1992 | Tsukamoto et al. | 455/450 |
| 5,627,525 A * | 5/1997 | Kudoh et al. | 340/7.52 |
| 5,929,774 A * | 7/1999 | Charlton | 340/7.1 |
| 6,028,529 A * | 2/2000 | Gotou | 340/7.41 |
| 6,138,002 A * | 10/2000 | Alperovich et al. | 455/407 |
| 6,393,306 B1 * | 5/2002 | Hobbi | 455/566 |
| 2003/0100323 A1 * | 5/2003 | Tajima et al. | 455/502 |

FOREIGN PATENT DOCUMENTS

| | | |
|---|---|---|
| JP | 5-165787 | 7/1993 |
| JP | 11-111890 | 4/1998 |
| JP | 10111890 A | 4/1998 |
| JP | 10303972 | 11/1998 |
| JP | 11-184912 | 7/1999 |
| JP | 11184912 A | 7/1999 |
| JP | 2001318175 | 11/2001 |
| JP | 2001331421 A | 11/2001 |

* cited by examiner

Primary Examiner—Jean Gelin
(74) Attorney, Agent, or Firm—Whitham, Curtis & Christofferson, PC

(57) ABSTRACT

Operable in synchronism with a current set date and time set by a user, each mobile communication terminal (101–104) has a registering function of registering schedule data (601–604) including a received schedule date and time received from base stations (201–204) and a notifying function of notifying the user of the schedule data when the current set date and time comes to a registered schedule date and time. Each mobile communication terminal corrects the received schedule date and time (611) on the basis of a current reference date and time (631) and the current set date and time (801) on receiving the schedule data to obtain the registered schedule date and time (611'). Each mobile communication terminal may receive information indicative of the current reference date and time from the base station with it added to the schedule data.

25 Claims, 7 Drawing Sheets

SCHEDULE NOTIFYING SYSTEM CAPABLE OF CORRECTING SCHEDULE DATE AND TIME

BACKGROUND OF THE INVENTION

This invention relates to a mobile communication terminal, a schedule date registering method, and a schedule notifying system.

Among current mobile communication terminals, there are mobile communication terminals having not only a function for exchanging speech (voice) and electronic mail but also a function for carrying out an individual schedule management. In addition to operation only in individual mobile communication terminal that a method comprising the steps of receiving schedule data using the electronic mail externally and registering the received schedule data is known in the art. By using this method in the business field, for example, for transmitting schedule data of a time instant for a meeting or the like may be transmitted to the mobile communication terminal for informing users of the schedule.

The schedule data obtained by the electronic mail generally includes a schedule date and time and notifying contents. The schedule date is described in a specific format and is transmitted and received. On the other hand, the date and time for a mobile communication terminal is set by a user and is operable in synchronism with a current set date and time. When the current set date and time comes to the schedule date and time included in the schedule date obtained from the electronic mail, a notification of the schedule is made from the mobile communication terminal.

However, the above-mentioned prior art has problems as follows. First, in a case of transmitting the schedule data to a plurality of mobile communication terminals, an error is included in a time instant (a current set date and time) set in an individual mobile communication terminal. Accordingly, when notification of the schedule is carried out on the basis of an obtained schedule date and time included in the schedule data, the notification is not simultaneously carried out. Second, in the event that a mobile communication terminal carries out a setting of an erroneous date and time caused by an erroneous operation of a user, it is impossible to carry out notification of the schedule at a desired date and time although the mobile communication terminal receives the schedule data. Third, a time difference may often occur in a case of globally transmitting and receiving the schedule date. Under the circumstances, it is impossible to record the schedule data at a date and time as it is although the schedule data is obtained.

Various related arts are already known. For example, Japanese Unexamined Patent Publication of Tokkai No. Hei 5-165,787 or JP-A 5-165787 proposes a small-sized electronic appliance system which is capable of always reporting correct schedule time by an electronic notebook. According to JP-A 5-165787, the small-sized electronic appliance system consists of a paging receiver as a first electronic appliance and the electronic notebook as a second electronic appliance. The paging receiver corrects the time date of a receiver built-in clock circuit if data sent by radio is the time date and produces the corrected time data to the outside. The electronic notebook is connected to the paging receiver. When the electronic notebook is supplied with the time data from the paging receiver, the electronic notebook corrects the time data of a notebook built-in clock circuit in accordance with the supplied time data. With this structure, the correcting work of the notebook built-in clock circuit is automatically performed in response to the reception of the time data in the paging receiver.

However, JP-A 5-165787 merely discloses a technical idea for automatically correcting time data in the notebook built-in clock circuit of tile electronic notebook in itself if data transmitted by radio is the time data but neither discloses nor teaches correction of a schedule date and time included in schedule data.

Japanese Unexamined Patent Publication of Tokkai No. Hei 10-111,890 or JP-A 10-111890 proposes a schedule adjustment method which is capable of performing schedule adjustment relating to a plurality of persons. According to JP-A 10-111890, mobile terminals are information terminals carried and processed by respective individuals. Each mobile terminal has an individual schedule management function and a communication function for connecting a mobile terminal controller or the like through a PHS network, a public network and a WAN/LAN, etc., by means of radio communication with a radio base station of the PHS network. The mobile terminal controller accesses the respective mobile terminals carried and possessed by schedule adjustment objective persons, receives respective individual schedule data, judges schedule free time in common to all members based on them, decides candidate date and time matched with schedule adjustment conditions among them, and informs the respective mobile terminals of them.

However, JP-A 10-111,890 merely discloses a technical idea for performing adjustment of the schedule relating to a plurality of persons and for transmitting the adjusted schedule to the respective mobile terminals but neither discloses nor teaches simultaneously notification of a schedule.

Japanese Unexamined Patent Publication of Tokkai No. Hei 11-184,912 or JP-A 11-184912 proposes a schedule adjustment service providing apparatus which is capable of registering a schedule that is efficient and optimal for a member. According to JP-A 11-184912, the schedule adjustment service providing apparatus comprises schedule management storage means, place information management storage means, display processing means, allowable time preference registering means, and notification processing means. The schedule management storage means stores schedule data for members that are inputted by respective member's terminals. The place information management storage means preliminary stores moving time data between places. The display processing means displays a registering method and presents a screen for inputting data needed for the selected registering method. The allowable time preference registering means registers the schedule within an allowable moving time with reference to the schedule data stored in the schedule management storage means, the moving time data, and data inputted by the member. The notification processing means notifies the terminal of the member of the registered schedule.

However, JP-A 11-184912 merely discloses a technical idea for registering the most suitable schedule for the member that is adjusted in consideration of the moving time of the member but neither discloses nor teaches simultaneously notification of a schedule.

SUMMARY OF THE INVENTION

It is an object of this invention to provide mobile communication terminals which are capable of simultaneously notifying users of a schedule, a time instant or the like when a current time instant reaches a predetermined time instant regardless of the presence or absence of variation in date and time set in the respective mobile communication terminals.

It is another object of this invention to provide a schedule data registering method which is capable of simultaneously notifying users for respective mobile communication terminals of a schedule, a time instant or the like when a current time instant reaches a predetermined time instant regardless of the presence or absence of variation in date and time set in the respective mobile communication terminals.

It is still another object of this invention to provide a schedule notifying system which is capable of simultaneously notifying users for respective mobile communication terminals of a schedule, a time instant or the like when a current time instant reaches a predetermined time instant regardless of the presence or absence of variation in date and time set in the respective mobile communication terminals.

Other objects of this invention will become clear as the description proceeds.

This invention has the following characteristics. (1) A management of a reference date and time is carried out by a base station. (2) A current reference date and time obtained from the base station is added to obtained schedule date as extended information. (3) A process of comparing the reference date and time for the obtained schedule data with a set date and time for a mobile communication terminal to correct the schedule date is added. (4) Notification of schedule can be carried out on the basis of the reference date and time into which an error of the set date and time by a user is corrected by the above-mentioned characteristic (3). (5) The notification of the schedule may be simultaneously made in a case where schedule data is transmitted to a plurality of mobile communication terminals and broadcasting feature is maintained. (6) The above mentioned Characteristic (5) may be extended in a case of transmission and reception of the schedule data between places having a time difference.

According to a first aspect of this invention, a mobile communication terminal is operable in synchronism with a current set date and time set by a user. The mobile communication terminal has a registering function for registering schedule data including a received schedule date and time received from a base station and a notifying function for notifying the user of the schedule data when the current set data and time comes to a registered schedule date and time. The mobile communication terminal comprises a correcting arrangement for correcting the received schedule date and time on the basis of a current reference date and time and said current set date and time on receiving the schedule data to obtain the registered schedule date and time.

In the mobile communication terminal according to the first aspect of this invention, the mobile communication terminal preferably may receive information indicative of the current reference date and time from the base station with it added to the schedule data. The correcting arrangement makes the received schedule date and time the registered schedule date and time as it is when the current reference date and time is equal to the current set date and time. On the other hand, when the current reference date and time is different from the current set date and time, the correcting arrangement obtains, as the registered schedule date and time, a date and time obtained by subtracting a difference from the received schedule date and time. The difference is obtained by subtracting the current set date and time from the current reference date and time.

According to a second aspect of this invention, a mobile communication terminal is operable in synchronism with a current set date and time set by a user. The mobile communication terminal has a registering function for registering schedule data including a received schedule date and time received from a base station and a notifying function for notifying the user of the schedule data when the current set data and time comes to a registered schedule date and time. The mobile communication terminal comprises a correcting arrangement for correcting the received schedule date and time on the basis of a time difference, and a current reference date and time and the current set date and time on receiving the schedule data to obtain the registered schedule date and time.

In the mobile communication terminal according to the second aspect of this invention, the mobile communication terminal preferably may receive information indicative of the current reference date and time and information indicative of the time difference from the base station with it added to the schedule data. The correcting arrangement includes an arrangement for correcting the received schedule date and time using the time difference to calculate a corrected schedule date and time. The correcting arrangement further comprises an arrangement for making the corrected schedule date and time the registered schedule date and time as it is when the current reference date and time is equal to the current set date and time. On the other hand, when the current reference date and time is different from the current set date and time, the correcting arrangement further comprises an arrangement for obtaining, as the registered schedule date and time, a date and time obtained by subtracting a difference from the corrected schedule date and time. The difference is obtained by subtracting the current set date and time from the current reference date and time.

According to a third aspect of this invention, a method for registering, in a mobile communication terminal operable in synchronism with a current set date and time set by a user; schedule data including an obtained schedule date and time obtained by receiving it from a base station, comprises the steps of correcting the obtained schedule date and time on the basis of a current reference date and time and the current set date and time on receiving the schedule data to obtain a registered schedule date and time and of registering schedule date including the registered schedule date and time.

In the schedule data registering method according to the third aspect of this invention, the method desirably fierier comprises the step of receiving information indicative of the current reference date and time from the base station with it added to the schedule data. The correcting step makes the obtained schedule date and time the registered schedule date and time as it is when the current reference date and time is equal to the current set date and time. On the other hand, when the current reference date and time is different from the current set date and time, the correcting step calculates, as the registered schedule date and time, a date and time obtained by subtracting a difference from the obtained schedule date and time. The difference is obtained by subtracting the current set date and time from the reference date and time.

According to a fourth aspect of this invention, a method for registering, in a mobile communication terminal operable in synchronism with a current set date and time set by a user; schedule data including an obtained schedule date and time obtained by receiving it from a base station, comprises the steps of correcting the obtained schedule date and time on the basis of a time difference, and a current reference date and time and the current set date and time on receiving the schedule data to obtain a registered schedule date and time and of registering schedule date including the registered schedule date and time.

In the schedule data registering method according to the fourth aspect of this invention, the method preferably further comprises the step of receiving information indicative of the current reference date and time and information indicative of the time difference from the base station with it added to the schedule data. The correcting step includes the step of correcting the obtained schedule date and time using the time difference to calculate a corrected schedule date and time. The correcting step further comprises the step of making the corrected schedule date and time the registered schedule date and time as it is when the current reference date and time is equal to the current set date and time. On the other hand, when the current reference date and time is different from the current set date and time, the correcting step further comprises the step of calculating, as the registered schedule date and time, a date and time obtained by subtracting a difference from the corrected schedule date and time. The difference is obtained by subtracting the current set date and time from the reference date and time.

According to a fifth aspect of this invention, a schedule notifying system comprises a mobile communication network, an information terminal, another network for connecting between the information terminal and the mobile communication network, a plurality of base stations connected to the mobile communication network, and a plurality of mobile communication terminals for carrying out transmission and reception with any of the plurality of base stations. The information terminal transmits schedule data including an original schedule date and time to the plurality of base stations via the other network and the mobile communication network. Each of the plurality of base stations receive the schedule data from the information terminal and transmits the received schedule data toward the mobile communication terminals belonging to an area of the base station in question. Each of the plurality of mobile communication terminals are operable in synchronism with a current set date and time set by a user. Each of the plurality of mobile communication terminals have a registering function for registering the schedule data received from the base station and a notifying function for notifying the user of the schedule date when the current set date and time comes to a registered schedule date and time. All of the plurality of base stations are operable in synchronism with a current reference date and time in common. Each of the plurality of base stations include an arrangement for transmitting the received schedule date with information indicative of the current reference date and time added thereto. Each of the plurality of mobile communication terminals comprise a correcting arrangement for correcting the original schedule date and time included in the received schedule date on the basis of the current reference date and time and the current set date and time on receiving the schedule date to obtain the registered schedule date and time.

In the schedule notifying system according to the fifth aspect of this invention, the correcting means makes the original schedule date and time the registered schedule date and time as it is when the current reference date and time is equal to the current set date and time. On the other hand, when the current reference date and time is different from the current set date and time, the correcting arrangement obtains, as the registered schedule date and time, a date and time obtained by subtracting a difference from the original schedule date and time. The difference is obtained by subtracting the current set date and time from the current reference date and time.

According to a sixth aspect of this invention, a schedule notifying system comprises a mobile communication network, an information terminal, another network for connecting between the information terminal and the mobile communication network, a plurality of base stations connected to the mobile communication network, and a plurality of mobile communication terminals for carrying out transmission and reception with any of the plurality of base stations. The information terminal transmits schedule data including an original schedule date and time to the plurality of base stations via the other network and the mobile communication network. Each of the plurality of base stations receive the schedule data from the information terminal and transmits received schedule data toward the mobile communication terminals belonging to an area of the base station in question. Each of the plurality of mobile communication terminals are operable in synchronism with a current set date and time set by a user. Each of the plurality of mobile communication terminals have a registering function for registering the schedule data received from the base station and a notifying function for notifying the user of the schedule date when the current set date and time comes to a registered schedule date and time. All of the plurality of base stations are operable in synchronism with a current reference date and time in common. Each of the plurality of base stations include an arrangement for transmitting the received schedule data with information indicative of the current reference date and time and information indicative of a time difference added thereto. Each of the plurality of mobile communication terminals comprise a correcting arrangement for correcting the original schedule date and time included in the received schedule data on the basis of the time difference, the current reference date and time and the current set date and time on receiving the schedule date to obtain the registered schedule date and time.

In the schedule noticing system according to the sixth aspect of is invention, the correcting arrangement includes an arrangement for correcting the original schedule date and time using the time difference to calculate a corrected schedule date and time. The correcting arrangement further comprises an arrangement for making the corrected schedule date and time the registered schedule date and time as it is when the current reference date and time is equal to the current set date and time. On the other hand, when the current reference date and time is different from the current set date and time, the correcting arrangement further comprises an arrangement for obtaining, as the registered schedule date and time, a date and time obtained by subtracting a difference from the corrected schedule date and time. The difference is obtained by subtracting the current set date and time from the current reference date and time.

DESCRIPTION OF THE PREFERRED EMBODIMENTS

Figure 1:
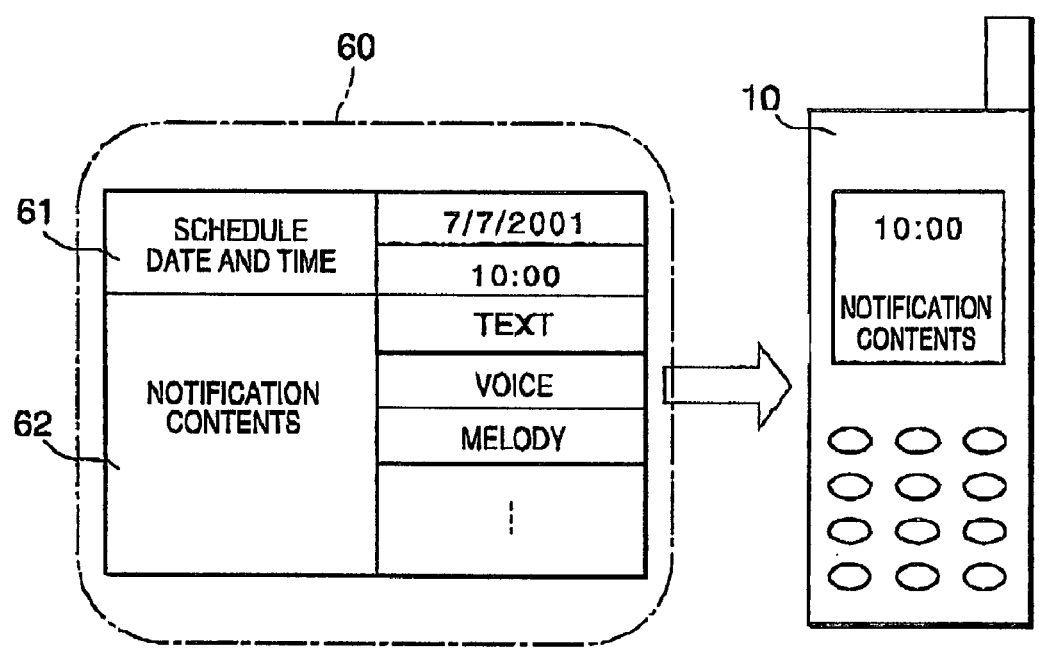
FIG. 1 shows an image of obtaining conventional schedule data by means of an electronic mail.

Referring to FIG. 1, a conventional schedule notifying method will be described first in order to facilitate an understanding of the present invention. FIG. 1 shows an image of conventional schedule data obtained by an electronic mail.

Obtained by the electronic mail, schedule data 60 generally includes a schedule date and time 61 and notification contents 62. The schedule data 60 is described at a specific format. The schedule data 60 is transmitted from an information terminal (not shown) such as a computer and is received in a mobile communication terminal 10. In the example being illustrated, the schedule date and time 61 is set at 10:00, Jul. 7, 2001. The notification contents 62 may be a text, a voice, a melody, and so on.

On the other hand, the mobile communication terminal 10 is set with a date and time by a user and is operable in synchronism with a current set date and time. When the current set date and time comes to the schedule date and time 61 included in the schedule data 60 obtained from the electronic mail, a notification of the schedule is made from the mobile communication terminal 10.

However, the conventional schedule notifying method has the first through the third problems, as mentioned in the preamble of the instant specification.

Figure 2:
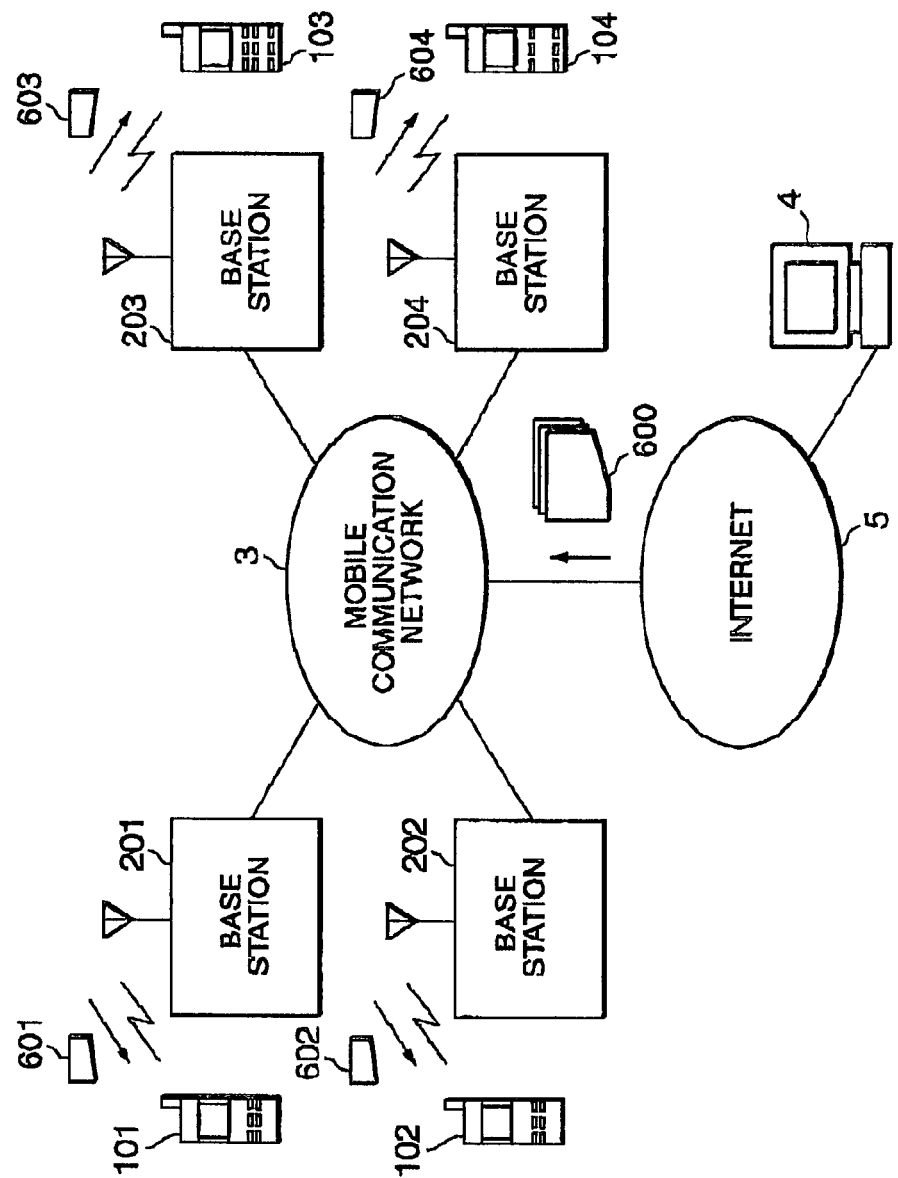
FIG. 2 is a block diagram of a schedule notifying system according to a first embodiment of this invention.

Referring to FIG. 2, a schedule notifying system according to a first embodiment of this invention is shown. The illustrated schedule notifying system comprises a mobile communication network 3, an information terminal 4 such as a computer connected to the mobile communication network 3 through the Internet 5, first through fourth base stations 201, 202, 203, and 204 which are connected to the mobile communication network 3, and first through fourth mobile communication terminals 101, 102, 103, and 104 which are connected to the first through the fourth base stations 201 to 204 by means of radio, respectively. Of course, the number of the base stations and the mobile communication terminals are not restricted to four.

In as much as the information terminal 4 is connected to the Internet 5, the information terminal 4 may transmit and receive information with other information terminals (not shown). Inasmuch as the information terminal 4 is connected to the mobile communication network 3 via the Internet 5, the information terminal 4 may transmit and receive information with the mobile communication terminals 101 to 104 such as portable telephone sets or the like.

On the other hand, inasmuch as the first through the fourth mobile communication terminals 101 to 104 are connected, by means of the radio, to the first through the fourth base stations 201 to 204 in areas to which they belong, respectively, the first through the fourth mobile communication terminals 101 to 104 may transmit voice or data to other mobile communication terminals and the information terminal 4.

In the first embodiment of this invention, each of the first through the fourth mobile communication terminals 101 to 104 has an individual schedule management function. It will be assumed that a user carries out a setting of a date and time (hh:mm, MM, DD, YYYY) of each of the first through the fourth mobile communication terminals 101 to 104 and registering of a schedule. Under the circumstance, it is possible in the first through the fourth mobile communication terminals 101 to 104 to carry out a notification of schedule contents by means of ringing of a schedule alarm or the like when a current set time instant comes to a predetermined time instant.

In addition, by using an electronic mail or the like from the external information terminal 4, it is possible to transmit schedule data to the first through the fourth mobile communication terminals 101 to 104 and to register the schedule date in them.

Figure 3:
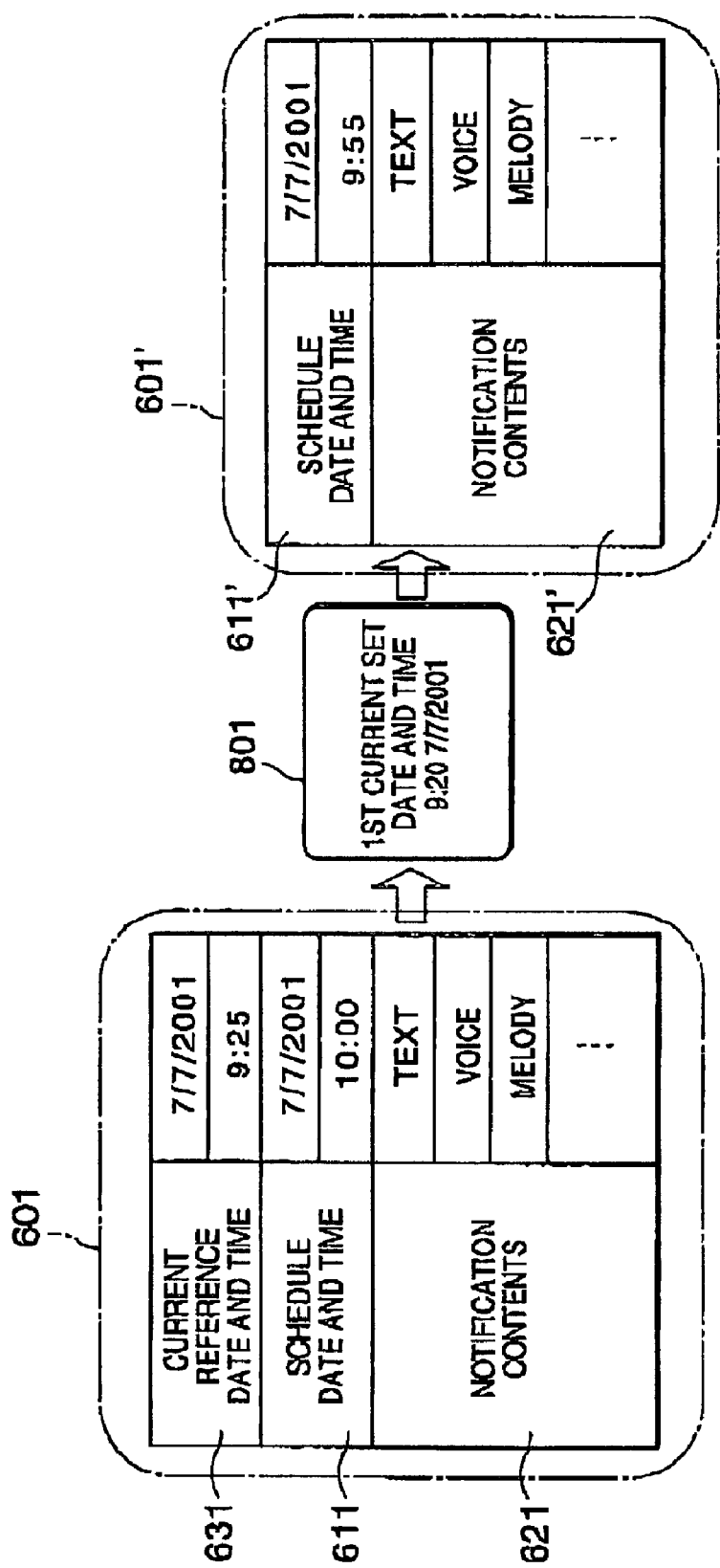
FIG. 3 shows first schedule data received in a first mobile communication terminal of the schedule notifying system illustrated in FIG. 2 and registered schedule data obtained by correcting it.

The schedule data has a structure as illustrated in FIG. 3 which will later be described. The first through the fourth mobile communication terminals 101 to 104 can obtain a current reference date and time from the first through the fourth base stations 201 to 204, respectively. Managed by the first through the fourth base stations 201 to 204, the current reference date and time is substantially the same date and time in the first through the fourth base stations 201 to 204 and always indicates a correct time instant.

The information terminal 4 such as the computer serves as an information server and can simultaneously transmit original schedule data 600 to the first through the fourth mobile communication terminals 101 to 104 using an electronic mail or the like. The original schedule data 600 is described in a format which may be read by the first through the fourth mobile communication terminals 101 to 104. The first through the fourth mobile communication terminals 101 to 104 can obtain the original schedule data 600 by accessing the information terminal 4 from the first through the fourth mobile communication terminals 101 to 104.

Figure 4:
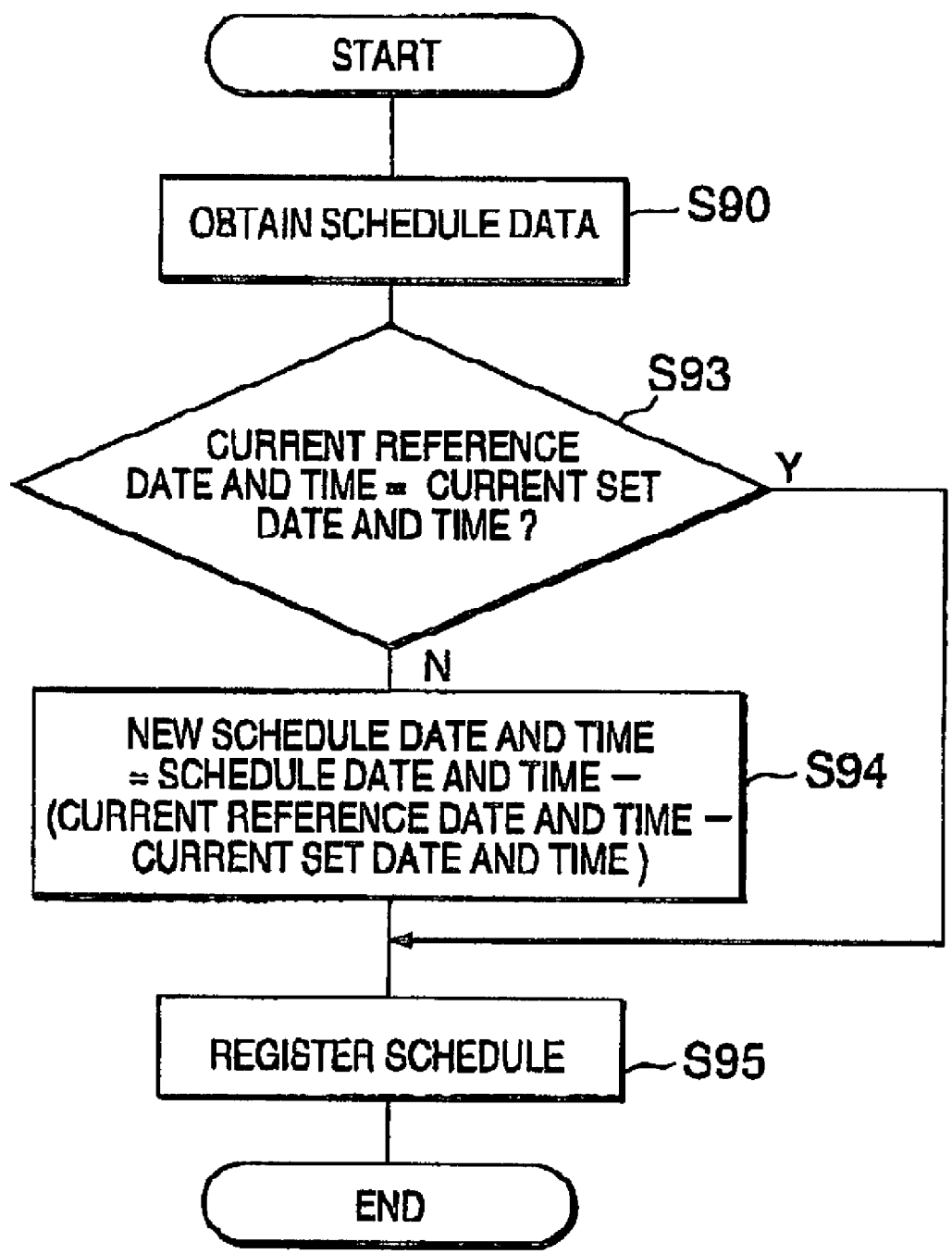
FIG. 4 is a flow chart for use in describing processing from obtaining the schedule date to registering it that is processed in each mobile communication terminal in the schedule notifying system illustrated in FIG. 2.

Referring now to FIGS. 2 through 4, the operation of the schedule notifying system according to the first embodiment of this invention is shown in detail.

Referring first to FIG. 2, an overall operation of the schedule notifying system will now be described.

Transmitted from the information terminal 4 such as the computer by means represented by the electronic mail, the original schedule data 600 is transmitted toward the first through the fourth mobile communication terminals 101 to 104 using the Internet 5 and the mobile communication network 3. The original schedule data 600 may be transmitted simultaneously or individually from the information terminal 4 to the first through the fourth mobile communication terminals 101 to 104 with reference to its form of use. Although the description is made regarding to a plurality of mobile communication terminals in this embodiment, a transmission destination may be one mobile communication terminal. The original schedule data 600 required may be obtained by accessing the information terminal 4 from the first through the fourth mobile communication terminals 101 to 104. Inasmuch as the first through the fourth mobile communication terminals 101 to 104 use radio communication, the first through the fourth mobile communication terminals 101 to 104 can receive first through fourth schedule data 601 to 604 from the first through the fourth base stations 201 to 204 to which they belong.

Referring now to FIG. 3, the description will proceed to the first through the fourth schedule data 601 to 604 received in the first through the fourth mobile communication terminals 101 to 104. Although the description will proceed only with the first mobile communication terminal 101, the structure and operation of each of the second through fourth mobile communication terminals 102 to 104 is similar to the first mobile communication terminal 101.

Received from the first base station 201, the first schedule data 601 has a structure including information illustrated in FIG. 3. The first schedule data 601 breaks down into an original schedule date and time 611 and notification contents 621 such as a text, a voice, a melody, and so on. Transmitted from the information terminal 4, the original schedule data 600 comprises the original schedule date and time 611 and the notification contents 621.

In the first schedule data 601 illustrated in FIG. 3, the original schedule date and time 611 is set at 10:00, Jul. 7, 2001. A current reference date and time 631 is set at 9:25, Jul. 7, 2001.

This embodiment is characterized in that the current reference date and time 631 obtained from the first base station 201 is added to the first schedule data 601 as extended information when the first mobile communication terminal 101 is put into a state where data can be received. The obtained first schedule data 601 may be taken in the first mobile communication terminal 101 to resister it as the first schedule data therein.

However, inasmuch as a setting of a date and time is generally made by a user in each of the first through the fourth mobile communication terminals 101 to 104, an error occurs in each of the set date and times. Accordingly, if only the original schedule data 600 is registered in the first through the fourth mobile communication terminals 101 to 104, notification of the schedule is simultaneously not made.

Thereupon, according to this invention, it is possible in the first through the fourth mobile communication terminals 101 to 104 to simultaneously carry out the notification of the schedule by calculating a difference (the current reference date and time—the current set date and time) between the current reference date and time 631 received from the first base station 201 and a first current set date and time 801 of the first mobile communication terminal 101 and by correcting the obtained first schedule data 601 into a first new schedule data 601'.

In the example being illustrated in FIG. 3, 9:20, Jul. 7, 2001 is set in the first mobile communication terminal 101 as the first current set date and time 801.

Referring to FIG. 4, processing in the first mobile communication terminal 101 for that purpose is shown. First, the first mobile communication terminal 101 obtains the first schedule data 601 from the network (step S90). Simultaneously, the first mobile communication terminal 101 starts analysis of its internal data and compares the current reference date and time 631 obtained from the first base station 201 with the first current set date and time 801 of the first mobile communication terminal 101 (step S93). If the current reference date and time 631 is equal to the first current set date and time 801, the first mobile communication terminal 101 does not correct the obtained first schedule data 601 and registers it as the fir&t new schedule data 601' therein (step S95).

If the current reference date and time 631 is different from the first current set date and time 801, the first mobile communication terminal 101 calculates the difference between the current reference date and time 631 and the first set date and time 801 or (the current reference date and time—the current set date and time) and corrects the original schedule date and time 611 of the obtained schedule data using the difference (step S94). As a result, the calculated schedule date and time (a registered schedule date and time) 611' is corrected as the first new schedule data 601' and it is really registered in the first mobile communication terminal 101 (step S95). In the finally registered first new schedule data 601', the extended information is neglected because the registered schedule date and time 611' is corrected.

Referring to FIG. 3 as one example, inasmuch as the difference between the current reference date and time 631 and the first current set date and time 801 of the first mobile communication terminal 101 is +5 minutes, the first mobile communication terminal 101 shifts the obtained original schedule date and time by −5 minutes and carries out schedule registering at the registered schedule date and time 611' of 9:55 therein. In this event, although the first mobile communication terminal 101 notifies the schedule at 9:55, at this time, the current reference date and time is 10:00 and it is therefore possible to correctly notify the schedule.

By carrying out the above-mentioned processing for the second through the fourth mobile communication terminals 102 to 104, it is possible to simultaneously notify the schedule if the second through the fourth mobile communication terminals 102 to 104 obtain the same schedule data.

Figure 5:
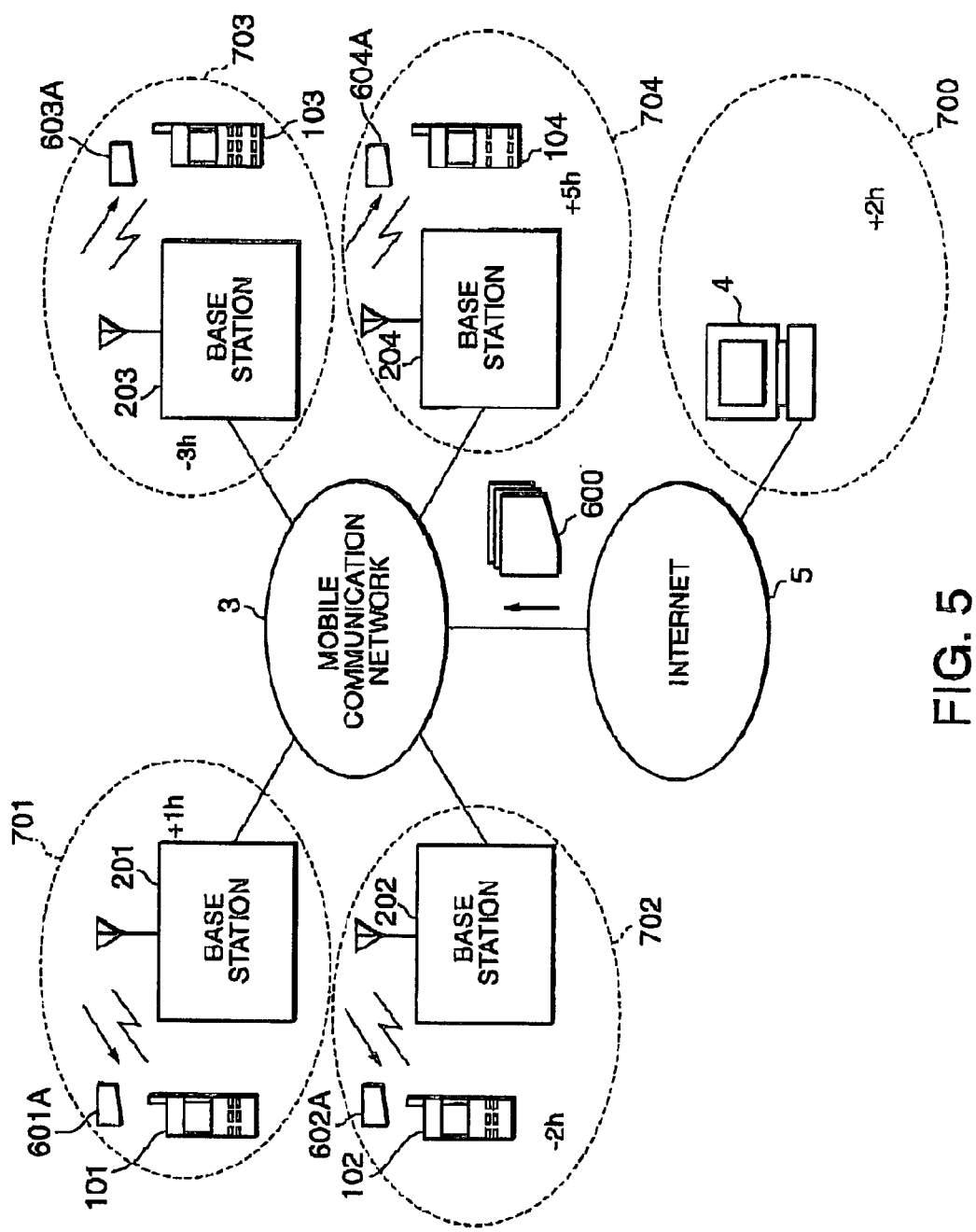
FIG. 5 is a block diagram of a schedule notifying system according to a second embodiment of this invention.

Referring now to FIG. 5, a schedule notifying system according to a second embodiment of this invention is shown in detail. The description will omit the common part of the first embodiment.

The second embodiment of this invention can obtain similar merit by extending the above-mentioned first embodiment in a situation where the schedule date is globally transmitted and received at a wide area of a country so as to straddle time zones, as illustrated in FIG. 4.

More specifically, the following will describe a case where there is a time difference so that a time zone 700 of a transmitting side and time zones 701 to 704 of receptions sides are different from each other. In the example being illustrated in FIG. 5, the information terminal 4 and the first through the fourth mobile communication terminals 101 to 104 are lain in different time zones 700 to 704 and there are time differences, respectively. Herein, the time zone 700 is called an original time zone (or a sending source time zone) while the time zones 701 to 704 are called first through fourth reception destination time zones. In the example being illustrated in FIG. 5, the sending source time zone 700 has a time difference of +2 hours with reference to a predetermined reference time while the first through the fourth reception destination time zones 701 to 704 has +1 hour, −2 hours, −3 hours, and +5 hours with reference to the predetermined reference time, respectively.

In this event, in the similar manner as the above-mentioned first embodiment, the first through the fourth mobile communication terminals 101 to 104 generally may carry out a setting of date and times in the first through the fourth reception destination time zones 701 to 704 in which they belong, respectively, although the original schedule data 600 is transmitted from the information terminal 4. Accordingly, although the first through the fourth mobile communication terminals 101 to 104 register the received first through fourth schedule data 601A to 604A as it is, an error of the notification of the schedule occurs by its time difference and it is impossible to simultaneously notify the schedule at a target time instant. In order to carry out broadcast notification, it is necessary to correct the first through the fourth schedule data 601A to 604A so as to cancel die time difference.

Figure 6:
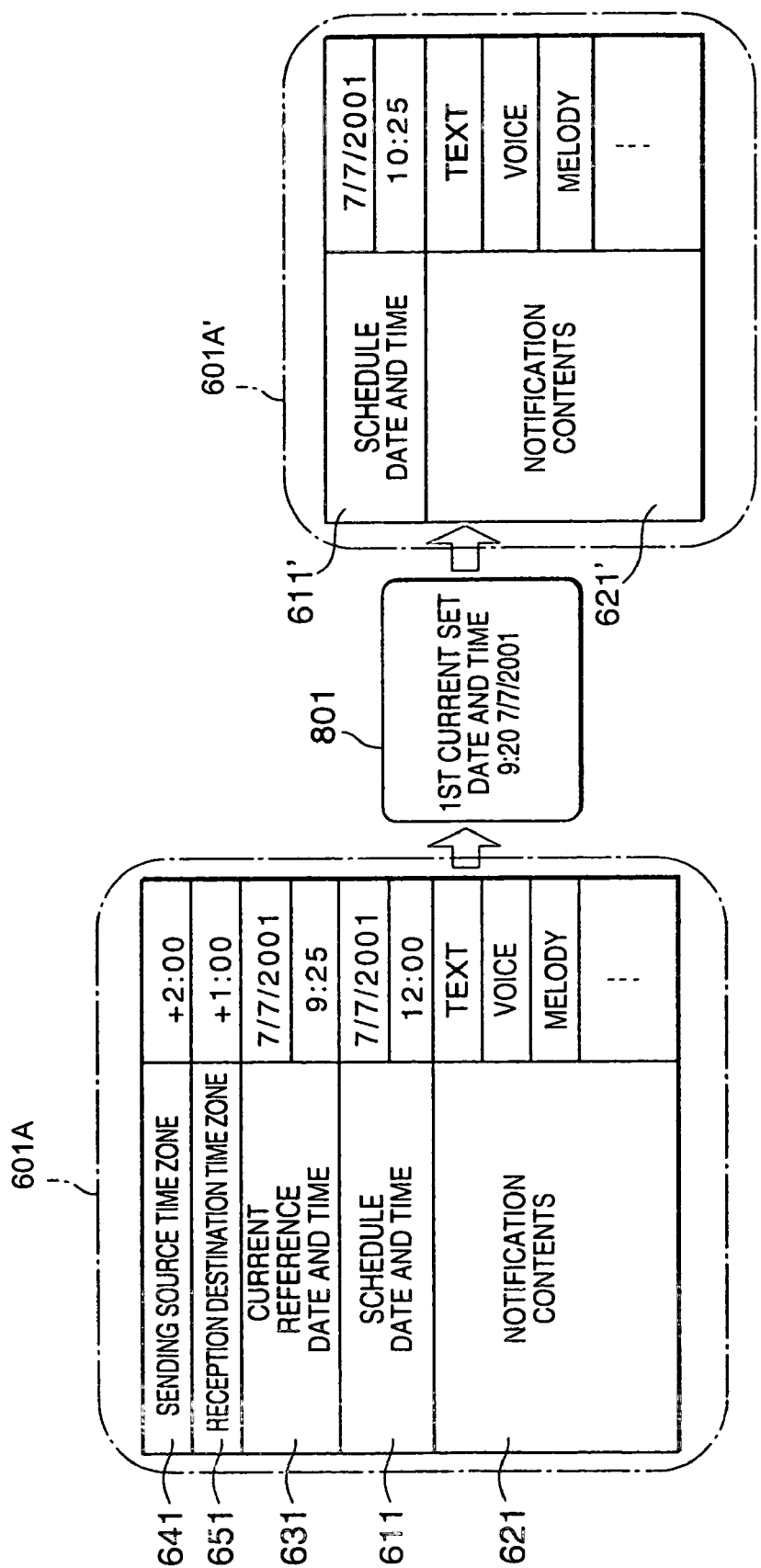
FIG. 6 shows first schedule data received in a first mobile communication terminal of the schedule notifying system illustrated in FIG. 5 and registered schedule data obtained by correcting it.
Figure 7:
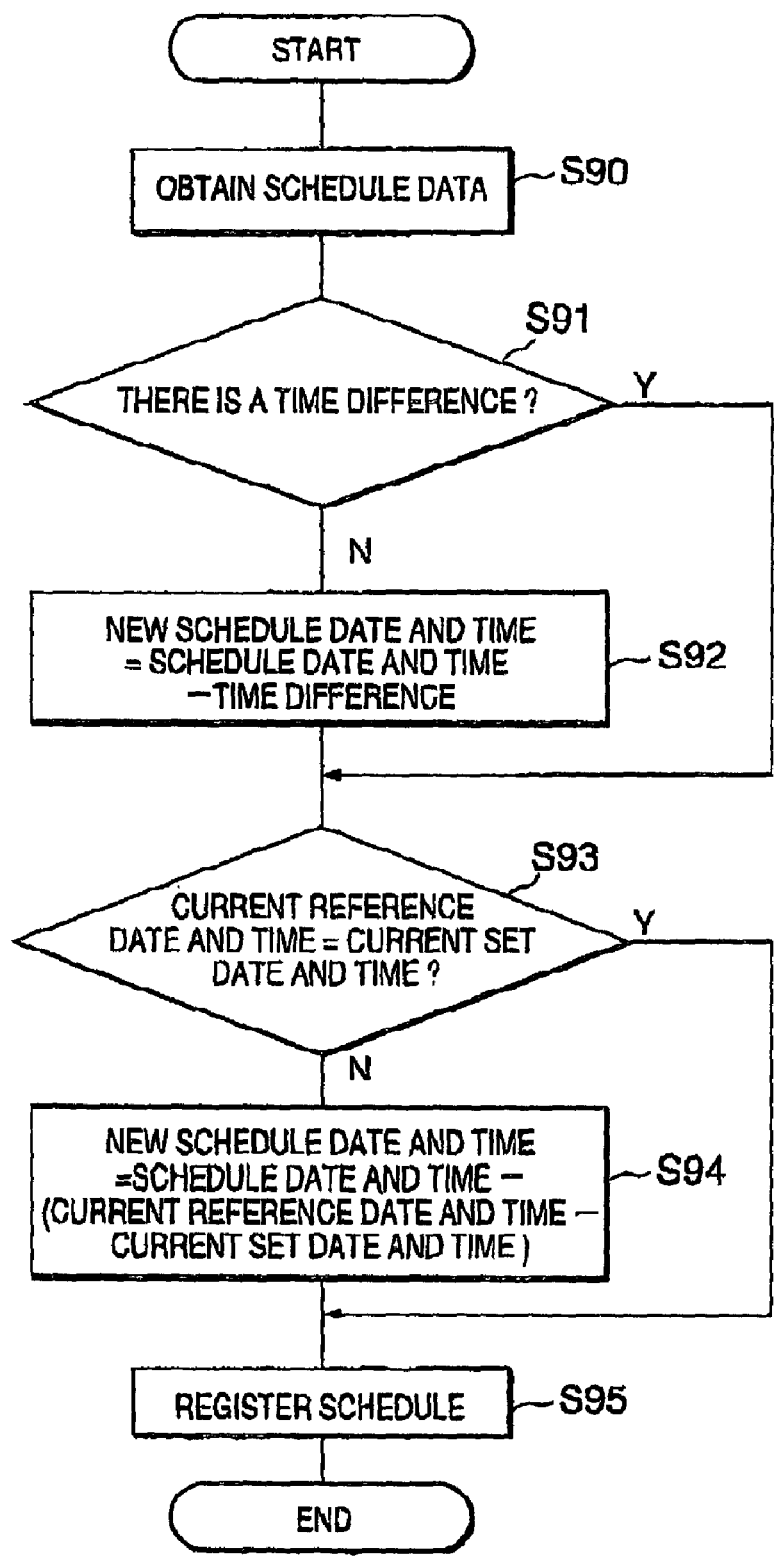
FIG. 7 is a flow chart for use in describing processing from obtaining the schedule date to registering it that is processed in each mobile communication terminal in the schedule notifying system illustrated in FIG. 5.

FIG. 6 shows structure of the first schedule date 601A in the second embodiment. The sending source time zone depicted at 641 and the first reception destination time zone depicted at 651 are added to the first schedule data 601A as extended information in addition to information illustrated in FIG. 3 in a case of the first embodiment. The sending source time zone 641 is added in the information terminal 4 serving as the sending source while the first reception destination time zone 651 is added in the first base station 201. Alternatively, the first mobile communication terminal 101 may hold them in itself on the basis of position registration information of the network side.

In the first schedule data 601A shown in FIG. 6, the sending source time zone 641 is +2:00 or has a time difference of +2 hours, the first reception destination time zone 651 is +1:00 or has a time difference of +1 hour, the original schedule date and time 611 is 12:00, Jul. 7, 2001, and the current reference date and time 631 is 9:25, Jul. 7, 2001. In addition, in the example being illustrated in FIG. 6, 9:20, Jul. 7, 2001 is set in the first mobile communication terminal 101 as the first current set date and time 801 in the similar manner in a cast illustrated in FIG. 3.

Referring now to FIG. 6, processing of the received first schedule data 601A in the second embodiment is shown. Compared with a case of the first embodiment, a different point is that a processing of comparing (step S901) a time difference between the sending source and the reception destination and of correcting (step S82) the schedule time instant (date and time) is added in a case of the second embodiment.

First, for the received first schedule data 601A, the first mobile communication terminal 101 compares the sending source time zone 641 with the first reception destination time zone 651 (the step S901). If the sending source time zone 641 is equal to the first reception destination time zone 651, there is no time difference and then the processing thereafter is quite similar to a case of the above-mentioned first embodiment.

On the other hand, it will be assumed that there is a time difference. In this event, the first mobile communication terminal 101 calculates its difference or (the sending source time zone—the reception destination time zone) and corrects the received original schedule date and time 611 on the basis of the difference (the step S92). On the basis of the corrected schedule date and time, in the similar manner in a case of the first embodiment, the first mobile communication terminal 101 compares the current reference date and time 631 with the current set date and time of the mobile communication terminal (the step S93), and corrects its difference or (the current reference date and time—the current set date and time) (the step S94). In the manner which is described above, by using two stage corrections consisting of a correction of the time difference and a difference of the current reference date and time/set date and time, notification of the schedule is simultaneously made although the original schedule data 600 is transmitted to a plurality of mobile communication terminals.

Referring to FIG. 6 as one example, inasmuch as the time difference between the sending source time zone 641 and the first reception destination time zone 651 is +1 hour, the first mobile communication terminal 101 shifts the obtained original schedule date and time 611 by −1 hour to obtain the corrected schedule date and time of 11:00. In addition, inasmuch as the difference between the current reference date and time 631 and the first current set date and time 801 of the first mobile communication terminal 101 is +5 minutes, the first mobile communication terminal 101 shifts the corrected schedule date and time by −5 minutes to carry out a schedule registration at the registered schedule date and time 611' of 10:55 therein. The first mobile communication terminal 101 notifies the schedule at 10:55, at this time, the current reference date and time of the information terminal 4 serving as the sending source is 12:00, and it is therefore possible to correctly notify the schedule.

The second embodiment has a merit where it is possible to ensure broadcasting of the schedule among the areas having time differences by adding correction with the time difference. The second embodiment further has a merit where it doesn't matter whether the users of the mobile communication terminals lie somewhere because the base station has information indicative of the current reference dale and time.

While his invention has thus far been described in conjunction with a few embodiments thereof, it will readily be possible for those skilled in the art to put this invention into practice in various other manners. For example, although description is made by exemplifying a case where connection between the information terminal 4 and the mobile communication network 3 is made via the Internet 5, another network may be used in lieu of the Internet 5. Although the computer is supposed as the information terminal 4 in the above-mentioned embodiments, another information terminal except for the computer may be used. Furthermore, although each mobile communication terminal obtains the information indicative of the current reference date and time and the information indicative of the time difference by receiving the information transmitted from the base station, each mobile communication terminal may obtain their information by means of another method.

What is claimed is:

1. A mobile communication terminal operable in synchronism with a current set date and time set by a user, said mobile communication terminal having a registering function for registering schedule data including a received schedule date and time received from a base station and a notifying function for notifying the user of said schedule data when said current set date and time comes to a registered schedule date and time, wherein said mobile communication terminal comprises correcting means for correcting said received schedule date and time on the basis of a current reference date and time and said current set date and time on receiving said schedule data to obtain said registered schedule date and time.

2. A mobile communication terminal as claimed in claim 1, wherein said mobile communication terminal receives information indicative of said current reference date and time from said base station with said current reference date and time added to said schedule data.

3. A mobile communication terminal as claimed in claim 1, wherein said correcting means makes said received schedule date and time equal said registered schedule date and time when said current reference date and time is equal to said current set date and time.

4. A mobile communication terminal as claimed in claim 1, wherein, when said current reference date and time is different from said current set date and time, said correcting means obtains, as said registered schedule date and time, a date and time obtained by subtracting a difference from said received schedule date and time, said difference being obtained by subtracting said current set date and time from said current reference date and time.

5. A mobile communication terminal operable in synchronism with a current set date and time set by a user, said mobile communication terminal having a registering function for registering schedule data including a received schedule date and time received from a base station and a notifying function for notifying the user of said schedule data when said current set date and time comes to a registered schedule date and time, wherein said mobile communication terminal comprises correcting means for correcting said received schedule date and time on the basis of a time difference, a current reference date and time and said current set date and time on receiving said schedule data to obtain said registered schedule date and time.

6. A mobile communication terminal as claimed in claim 5, wherein said mobile communication terminal receives information indicative of said current reference date and time and information indicative of said time difference from said base station with said time difference added to said schedule data.

7. A mobile communication terminal as claimed in claim 5, wherein said correcting means including means for correcting said received schedule date and time using said time difference to calculate a corrected schedule date and time.

8. A mobile communication terminal as claimed in claim 7, wherein said correcting means further comprises means for making said corrected schedule date and time equal said registered schedule date and time when said current reference date and time is equal to said current set date and time.

9. A mobile communication terminal as claimed in claim 7, wherein said correcting means further comprising means for obtaining, when said current reference date and time is different from said current set date and time, as said registered schedule date and time, a date and time obtained by subtracting a difference from said corrected schedule date and time, said difference being obtained by subtracting said current set date and time from said current reference date and time.

10. A method of registering, in a mobile communication terminal operable in synchronism with a current set date and time set by a user, schedule data including an obtained schedule date and time obtained by receiving it from a base station, said method comprising the steps of:
 correcting said obtained schedule date and time on the basis of a current reference date and time and said current set date and time on receiving said schedule data to obtain a registered schedule date and time; and
 registering schedule data including said registered schedule date and time.

11. A method as claimed in claim 10, wherein said method further comprising the step of receiving information indicative of said current reference date and time from said base station with said current reference date and time added to said schedule data.

12. A method as claimed in claim 10, wherein said correcting step makes said obtained schedule date and time equal said registered schedule date and time when said current reference date and time is equal to said current set date and time.

13. A method as claimed in claim 10, wherein said correcting step calculates, when said current reference date and time is different from said current set date and time, as said registered schedule date and time, a date and time by subtracting a difference from said obtained schedule date and time, said difference being obtained by subtracting said current set date and time from said reference date and time.

14. A method of registering, in a mobile communication terminal operable in synchronism with a current set date and time set by a user, schedule data including an obtained schedule date and time obtained by receiving it from a base station, said method comprising the steps of:
 correcting said obtained schedule date and time on the basis of a time difference, and a current reference date and time and said current set date and time on receiving said schedule data to obtain a registered schedule date and time; and
 registering schedule data including said registered schedule date and time.

15. A method as claimed in claim 14, wherein said method further comprises the step of receiving information indicative of said current reference date and time and information indicative of said time difference from said base station with said time difference added to said schedule data.

16. A method as claimed in claim 14, wherein said correcting step including the step of correcting said obtained schedule date and time using said time difference to calculate a corrected schedule date and time.

17. A method as claimed in claim 16, wherein said correcting step further comprises the step of making said corrected schedule date and time equal said registered schedule date and time when said current reference date and time is equal to said current set date and time.

18. A method as claimed in claim 16, wherein said correcting step further comprises the step of calculating, when said current reference date and time is different from said current set date and time, as said registered schedule date and time, a date and time by subtracting a difference from said corrected schedule date and time, said difference being obtained by subtracting said current set date and time from said reference date and time.

19. A schedule notifying system comprising a mobile communication network, an information terminal, another network for connecting between said information terminal and said mobile communication network, a plurality of base stations connected to said mobile communication network, and a plurality of mobile communication terminals for carrying out transmission and reception with any of said plurality of base stations, said information terminal transmitting schedule data including original schedule date and time to said plurality of base stations via said other network and said mobile communication network, each of said plurality of base stations receiving said schedule data from said information terminal and transmitting received schedule data toward said mobile communication terminals belonging to an area of said base station in question, each of said plurality of mobile communication terminals being operable in synchronism with a current set date and time set by a user, each of said plurality of mobile communication terminals having a registering function for registering said schedule data received from said base station and a notifying function for notifying the user of said schedule data when said current set date and time comes to a registered schedule date and time, wherein
 all of said plurality of base stations are operable in synchronism with a current reference date and time in common, each of said plurality of base stations including means for transmitting said received schedule data with information indicative of said current reference date and time added thereto; and
 each of said plurality of mobile communication terminals comprising correcting means for correcting said original schedule date and time included in said received schedule data on the basis of said current reference date and time and said current set date and time on receiving said schedule data to obtain said registered schedule date and time.

20. A schedule notifying system as claimed in claim 19, wherein said correcting means makes said original schedule date and time equal said registered schedule date and time when said current reference date and time is equal to said current set date and time.

21. A schedule notifying system as claimed in claim 19, wherein said correcting means obtains, when said current reference date and time is different from said current set date and time, as said registered schedule date and time, a date and time obtained by subtracting a difference from said original schedule date and time, said difference being obtained by subtracting said current set date and time from said current reference date and time.

22. A schedule notifying system comprising a mobile communication network, an information terminal, another network for connecting between said information terminal and said mobile communication network, a plurality of base stations connected to said mobile communication network, and a plurality of mobile communication terminals for carrying out transmission and reception with any of said plurality of base stations, said information terminal transmitting schedule data including original schedule date and time to said plurality of base stations via said other network and said mobile communication network, each of said plurality of base stations receiving said schedule data received from said information terminal and transmitting received schedule data toward said mobile communication terminals belonging to an area of said base station in question, each of said plurality of mobile communication terminals being operable in synchronism with a current set date and time set by a user, each of said plurality of mobile communication terminals having a registering function for registering said schedule data received from said base station and a notifying function for notifying the user of said schedule data when said current set date and time comes to a registered schedule date and time, wherein all of said plurality of base stations are operable in synchronism with a current reference date and time in common, each of said plurality of base stations including means for transmitting said received schedule data with information indicative of said current reference date and time and information indicative of a time difference added thereto; and each of said plurality of mobile communication terminals comprising correcting means for correcting said original schedule date and time included in said received schedule data on the basis of said time difference, and said current reference date and time and said current set date and time on receiving said schedule data to obtain said registered schedule date and time.

23. A schedule notifying system as claimed in claim 22, wherein said correcting means includes means for correcting said original schedule date and time using said time difference to calculate a corrected schedule date and time.

24. A schedule notifying system as claimed in claim 23, wherein said correcting means further comprises means for making said corrected schedule date and time equal said registered schedule date and time when said current reference date and time is equal to said current set date and time.

25. A schedule notifying system as claimed in claim 23, wherein said correcting means further comprises means for obtaining, when current reference date and time is different from said current set date and time, as said registered schedule date and time, a date and time obtained by subtracting a difference from said corrected schedule date and time, said difference being obtained by subtracting said current set date and time from said current reference date and time.

* * * * *